(12) United States Patent
Thirumalaisamy

(10) Patent No.: US 9,336,674 B1
(45) Date of Patent: May 10, 2016

(54) NOTIFYING A USER UTILIZING SMART ALERTING TECHNIQUES

(71) Applicant: Amazon Technologies, Inc., Reno, NV (US)

(72) Inventor: Ashokkumar Thirumalaisamy, Coimbatore (IN)

(73) Assignee: Amazon Technologies, Inc., Reno, NV (US)

( * ) Notice: Subject to any disclaimer, the term of this patent is extended or adjusted under 35 U.S.C. 154(b) by 268 days.

(21) Appl. No.: 14/094,497

(22) Filed: Dec. 2, 2013

(51) Int. Cl.
| G08B 25/10 | (2006.01) |
| G08B 23/00 | (2006.01) |
| G08B 7/00 | (2006.01) |
| H04M 1/725 | (2006.01) |
| H04W 68/02 | (2009.01) |

(52) U.S. Cl.
CPC .......... *G08B 23/00* (2013.01); *G08B 7/00* (2013.01); *G08B 25/10* (2013.01); *H04M 1/72547* (2013.01); *H04W 68/02* (2013.01); *H04M 2242/04* (2013.01)

(58) Field of Classification Search
USPC ................................................ 340/7.58, 7.59
See application file for complete search history.

(56) References Cited

U.S. PATENT DOCUMENTS

| 7,064,681 | B2 * | 6/2006 | Horstemeyer | B60R 25/102 340/573.4 |
| 7,574,382 | B1 * | 8/2009 | Hubert | G06Q 30/0623 705/26.61 |
| 7,945,469 | B2 * | 5/2011 | Cohen | G06Q 10/06 705/7.14 |
| 8,073,740 | B1 * | 12/2011 | Siegel | G06Q 30/06 705/26.1 |
| 8,165,560 | B2 * | 4/2012 | Stenquist | G08B 25/016 379/106.02 |
| 9,043,421 | B1 * | 5/2015 | Coon | H04L 51/30 709/200 |
| 2009/0281677 | A1 * | 11/2009 | Botich | G06Q 30/0283 700/295 |
| 2014/0108789 | A1 * | 4/2014 | Phatak | G06F 21/34 713/156 |
| 2014/0273977 | A1 * | 9/2014 | Colletti | H04M 1/72547 455/412.2 |
| 2015/0223039 | A1 * | 8/2015 | Toksvig | H04W 4/206 455/404.1 |

* cited by examiner

*Primary Examiner* — Brian Miller
(74) *Attorney, Agent, or Firm* — Kilpatrick Townsend & Stockton LLP

(57) ABSTRACT

A configuration associated with an electronic message may be received, the electronic message containing a keyword. Historical notification information comprising information about multiple electronic messages may be accessed to determine one or more related electronic messages. A number of related electronic messages may be determined by comparing the keyword to the historical notification information. An electronic notification may be generated based at least in part on the configuration information, the electronic message, and the multiple related electronic messages.

24 Claims, 9 Drawing Sheets

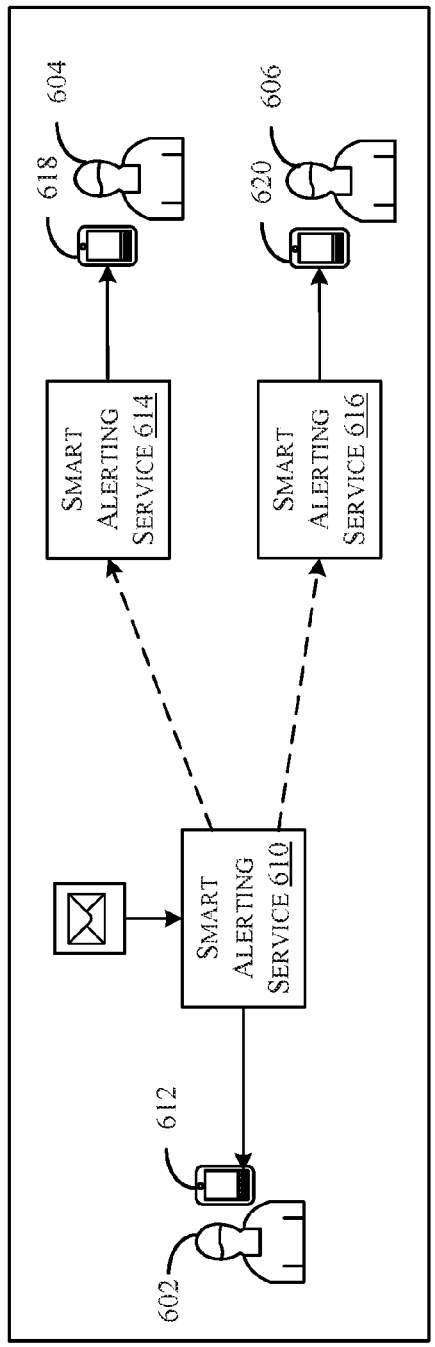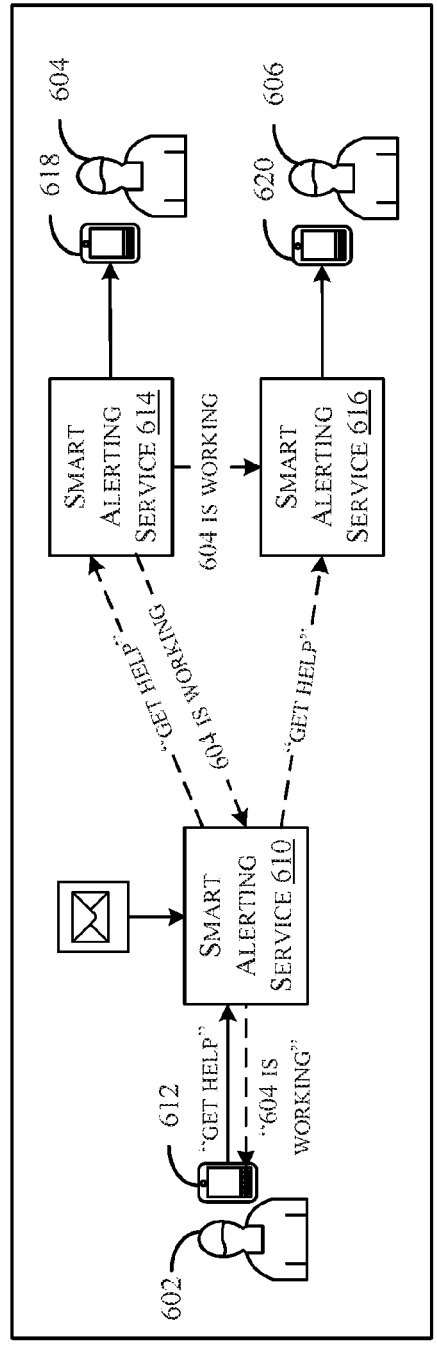
FIG. 6A
FIG. 6B

NOTIFYING A USER UTILIZING SMART ALERTING TECHNIQUES

BACKGROUND

Companies (e.g., electronic marketplace providers) often manage complex electronic systems that require frequent monitoring, troubleshooting, and maintenance by personnel (e.g., a technician). Due to the volume of issues that may arise from these electronic systems, it is often difficult to coordinate efforts between multiple technicians responsible for resolving these issues. Additionally, in order to achieve adequate coverage and efficient use of time, a technician may operate on an "on-call" basis, making it difficult for him to be notified when there is an issue requiring his attention. For example, the technician may be away from his computer (e.g., sleeping) when issues arise. Furthermore, newly received issues may exhibit similar or even identical attributes as one or more previously experienced issues. Current techniques for notifying the technician of pending issues include sending a message to the technician, but information about previous resolutions of similar problems is not accessed or utilized. Thus, prior techniques for notifying personnel of the existence of an issue lack efficiency and fail to leverage learned resolutions in light of previously experienced issues.

BRIEF DESCRIPTION OF THE DRAWINGS

Various embodiments in accordance with the present disclosure will be described with reference to the drawings, in which:

FIG. 6A and FIG. 6B are schematic diagrams depicting aspects of an example smart alerting service in accordance with at least one embodiment;

DETAILED DESCRIPTION

Figure 1:
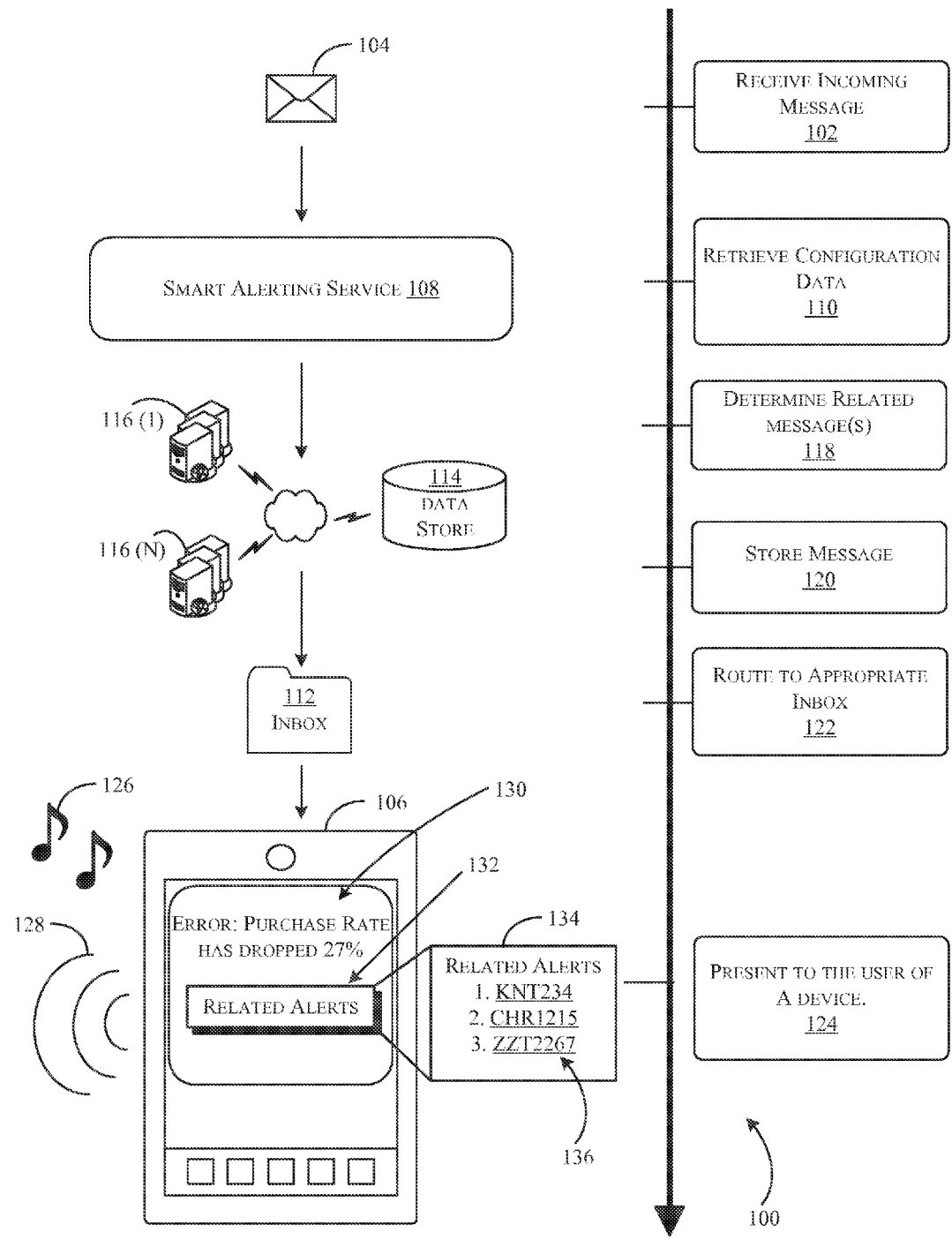
FIG. 1 illustrates an example flow for implementing a smart alerting service, in accordance with at least one embodiment.

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process described may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

Techniques described herein are directed to systems and methods to enable a user of an electronic device to utilize a smart alerting system to receive electronic alerts. In accordance with at least one embodiment, a user (e.g., a technician) may utilize a smart alerting service to receive and process electronic messages. The technician may configure an electronic device to recognize certain electronic messages as requiring treatment different from the treatment of other electronic messages. For instance, the technician may specify that emails, texts, or other electronic messages from a particular sender are to be processed by the smart alerting service. Other identification settings may be utilized, including, but not limited to, identifying an electronic message by addressee, by subject line analysis, by message body analysis, or by any suitable method for distinguishing one electronic message from another. In at least one embodiment, the technician may specify further configuration settings that enable the notification to be distinguishable by other means, for example utilizing audio, vibration, and/or text-to-speech settings.

As used herein, the term "delivery workflow" is intended to indicate a set of instructions or operations utilized to deliver/route a message to a user (e.g., the workflow may indicate each or a subset of all instructions involved in the routing and/or delivery of the message). As used herein, the term "resolution workflow" is intended to indicate instructions executed or operations taken during attempts to resolve a technical problem associated with a service provider.

In at least one embodiment, on receipt of an electronic message, the smart alerting service may retrieve configuration information in order to apply filters to identify an electronic message requiring smart alert processing. As used herein, configuration information may include, but is not limited to, delivery workflow(s) indicating routing instructions, group membership information, "one-click" options, audio and tactile associations, maximum related message options, and text-to-speech options. In some examples, utilizing configuration information, the smart alerting service may identify an electronic message as one requiring smart alert processing. In such examples, a delivery workflow may be identified indicating that the electronic message is to be routed to a particular location (e.g., a smart alert inbox accessible to a particular cell phone). Once routed, the smart alerting service may store at least a portion of, if not the entire, electronic message. In at least one case, the electronic message may be stored locally on the electronic device. In at least one example, the smart alerting service may cause at least one configured audible or tactile response to occur upon delivery of the electronic message to the particular location.

In at least one embodiment, the smart alerting service, on receipt of a new electronic message, may analyze the newly received electronic message for keywords. These keywords may be compared with keywords found in previously received electronic messages. In cases where similar electronic messages are discovered as a result of the comparison, information related to the similar electronic message may be included, attached, or otherwise associated with the newly received electronic message and, ultimately, made available to the technician.

In at least one embodiment, the smart alerting service may forward received electronic messages to other users (e.g., other technicians) within a configured group. In some cases, the system may mark the message as "active" or "inactive" to distinguish what action(s) may be taken on receipt. Messages marked as "active" may result in both storage and actual notification of a technician, while messages marked "inactive" may result in storage only. In this manner, the smart alerting service enables the synchronization of resolution efforts between a group of users while leveraging information gathered from the processing of previously received electronic messages.

In at least one example, a technician, responsible for managing components of an electronic marketplace, may enter configuration information indicating that he wishes to be notified on receipt of an electronic message from "technical-group@companyA.com." Additionally, the technician may specify that electronic messages from technical-group@companyA.com are to be delivered to a smart alerting inbox accessible to his cell phone, the inbox entitled "Work Alerts." The technician may indicate that he wishes a particular musical tune to be played on receipt of such a message. Additionally, the technician may select a series of vibrations to occur before, during, or after the musical tune. Further, the technician may indicate that he wishes a portion of the alert text to be read aloud using text-to-speech technology. At some point post-configuration, the technician may receive an electronic message from technical-group@companyA.com. The message may be identified through configuration information and routed to the "Work Alerts" inbox. Once received, the smart alerting service may cause the musical tune "Ode to Joy" to play on the device while simultaneously causing the device to vibrate three times. Additionally, the smart alerting service may cause a portion of the message to be read aloud using text-to-speech technology. For instance, the technician may hear the words "Attention! Zero purchases have been made in the electronic marketplace in the last 10 minutes." In this manner, the technician may be alerted to a potential issue regarding the electronic marketplace though he may not actively be operating his cell phone at the time the alert is received.

Though illustrative examples are provided, including technicians responsible for managing electronic marketplace systems, one reasonably skilled in the art should appreciate that other professions may utilize the smart alerting service. For instance, on-call doctors may act on emergency messages utilizing a smart alerting service. On receipt of a message, configuration information may be identified in a similar manner as described above. The received message may be analyzed for keywords and compared to historical records of previously received emergency/medical messages. Multiple doctors identified as a group may be notified, utilizing the smart alerting system, by synchronizing the message among members of the medical group. In this manner, an increase in coverage may be achieved through increasing the likelihood of response.

Referring now to the drawings, in which like reference numerals represent like parts. FIG. 1 illustrates an example flow for implementing a smart alerting service, in accordance with at least one embodiment. The flow 100 may begin at 102, where message 104 may be received on an electronic device, for instance, a cell phone 106. The smart alerting service 108, on receipt of message 104, may retrieve configuration information at 110. The configuration information 110 can be stored on the same device as the smart alerting service 108 or remote of this device. As discussed previously, configuration information may include information identifying attributes of message 104. These attributes may indicate whether or not message 104 is to be processed as a smart alert and routed to an inbox (e.g., smart alert inbox 112) located on the cell phone 106. Further, configuration data may also indicate an association to a particular musical tune, a particular series of vibrations, and/or text-to-speech alerting.

In at least one embodiment, using traditional linguistic analysis techniques, smart alerting service 108 may analyze the subject line and/or the body of message 104 to determine keywords. At 118 smart alerting service 108 may query data store 114, a local data store of cell phone 106, and/or service provider computers 116(1)-(N) connected to any suitable network(s) 118 in order to determine related messages having been previously received. By way of example only, data store 114 and/or service provider computers 116 may, individually or collectively, manage a collection of previously received messages and issue resolution information corresponding to the previously received messages. If a single previously received message is found to be associated with a similar or identical keyword as may be found in message 104, the single previously received message information may be associated with message 104 at 118. If multiple previously received messages are found to be associated with similar or identical keyword(s) as may be found in message 104, a message identifier (e.g., a work order number) for each of the previously received messages may be associated with message 104 at 118. Alternatively, the previously received message may be ranked based at least in part on the strength of similarity between keywords of message 104 and the previously received message. In some embodiments, a subset of the previously received messages (e.g., the top 5 highest-scored previously received messages, the first 5 previously received messages found with similar/identical keyword(s) as message 104), ranked or unranked, may be associated with message 104. In at least one example, a message identifier (e.g., a work order number) of the single, previously received message may be inserted into the text of message 104. At 120, smart alerting service 108 may then cause message 104 to be stored in data store 114 and/or service provider computers 116(1)-(N). In at least one example, message 104 may be routed by smart alerting service 108 to an appropriate smart alert inbox at 122, as configured by the user.

In at least one embodiment, message 104 may be routed by smart alerting service 108 to inbox smart alert inbox 112. Once received, smart alerting service 108 may present an alert to the user of device 106 at 124. On delivery of the alert to smart alert inbox 112, smart alerting service 108 may cause a configured musical tune 126 to play, vibration 128 to occur, and text 130 to display on the display screen of device 106.

In accordance with at least one embodiment, a button 132 may be provided indicating one or more related alerts. Upon selection of button 132, a new screen may be displayed similar to related alert screen 134. The related alert screen 134 may display an ordered list of the related alert identifiers as determined by the keyword comparison discussed above. The related alert screen 134, displayed in FIG. 1, indicates that alert KNT234 was determined to be the alert most related to the current alert, with alert CHR1215, and alert ZZT2267 being each comparatively less related, respectively. If the user has previously enabled "one-click" options via configuration information, then related alert screen 134 may include hyperlinks 136 indicated by the alert identifiers. If a user were to select one such hyperlink, the user might be transferred to an internet browser application where the URL corresponding to the selected hyperlink may be loaded. In at least one example, selection of one of the hyperlinks 136 might result in the user being displayed, in an Internet browser, text corresponding to the select related alert. This text may include at least one of a problem description, a description of steps taken during resolution attempts, and a listing of any commands executed in any of the resolution attempts.

Thus, in accordance with embodiments, utilizing a smart alerting service 108, systems and methods are provided for enabling a user to receive electronic alerts.

Figure 2:
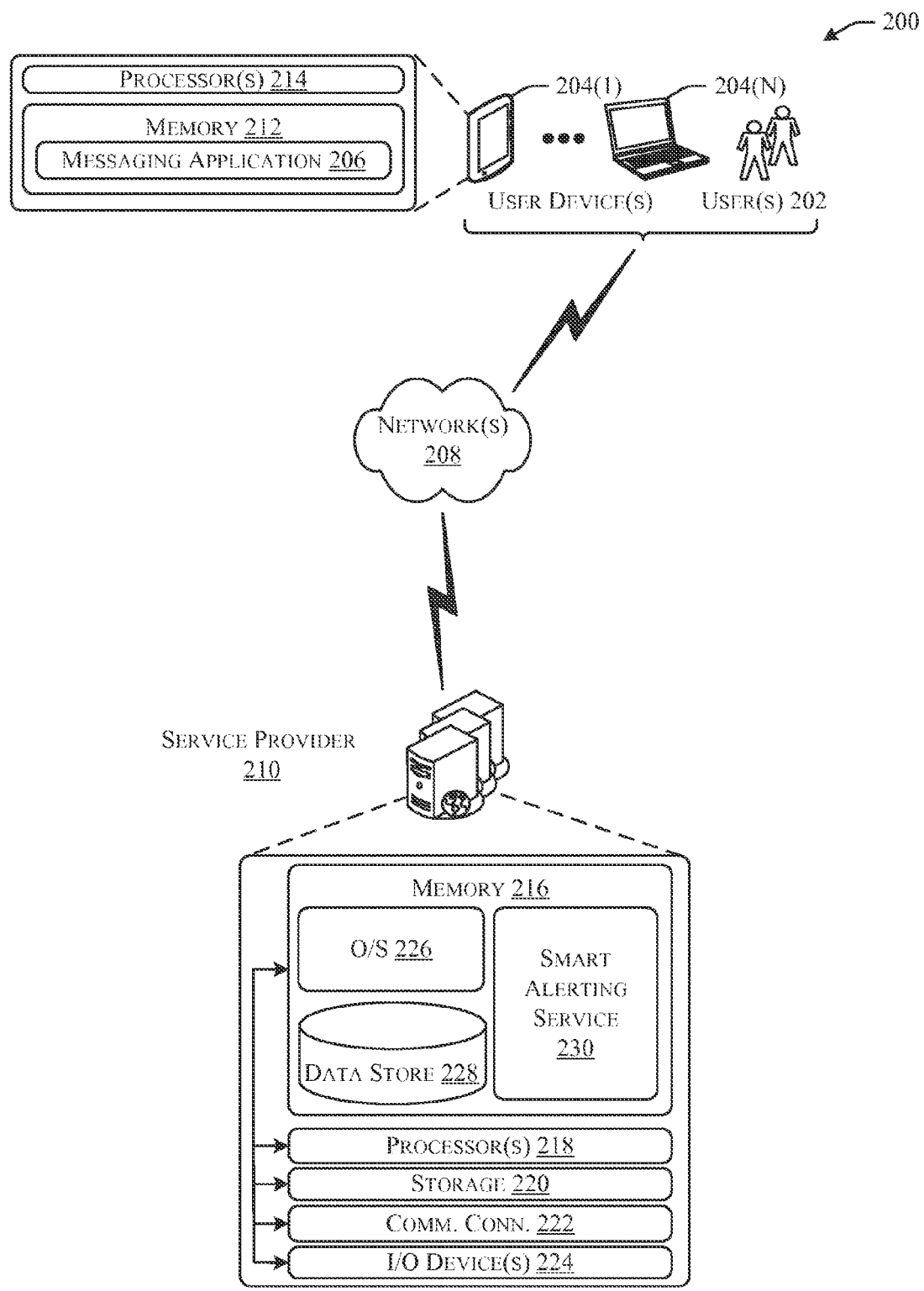
FIG. 2 illustrates an example architecture for providing the smart alerting service, in accordance with at least one embodiment.

FIG. 2 illustrates an example architecture for providing the smart alerting service, in accordance with at least one embodiment. In architecture 200, one or more users 202 (e.g., technical specialists and/or system administrators) may utilize user computing devices 204(1)-(N) (collectively, user computing devices 204) to access a messaging application 206 (e.g., a cell phone email application) or a user interface accessible through the messaging application 206 via one or more networks 208. In some aspects, the messaging application 206 may be hosted, managed, and/or provided by a computing resources service or service provider, such as by utilizing one or more service provider computers 210. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks and other private and/or public networks. While the illustrated example represents the users 202 accessing the browser application 206 over the networks 208, the described techniques may equally apply in instances where the users 202 interact with the service provider computers 210 via the one or more user computing devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the messaging application 206 may allow the users 202 to interact with the service provider computers 210 (e.g., via smart alerting service 108), such as to access information associated with previously received electronic messages. The one or more service provider computers 210, perhaps arranged in a cluster of servers or as a server farm, may host the browser application 206 and/or cloud-based software services. Other server architectures may also be used to host the messaging application 206 and/or cloud-based software services. The messaging application 206 may be capable of handling requests from many users 202 and serving, in response, various user interfaces that can be rendered at the user computing devices 204 such as, but not limited to, perceived latency or the like. The messaging application 206 can provide any type of website that supports user interaction, including search engine sites. As discussed above, the described techniques can similarly be implemented outside of the messaging application 206, such as with other applications running on the user computing devices 204.

The user computing devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user computing devices 204 may be in communication with the service provider computers 210 via the networks 208, or via other network connections. Additionally, the user computing devices 204 may be part of the distributed system managed by, controlled by, or otherwise part of the service provider computers 210.

In one illustrative configuration, the user computing devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user computing device 204, the memory 212 may be volatile (such as random access memory (RAM)) and/or non-volatile (such as read-only memory (ROM), flash memory, etc.). The user computing device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including at least the perceived latency, such as via the messaging application 206 or dedicated applications (e.g., smart phone applications, tablet applications, etc.). The messaging application 206 may be configured to receive, store, and/or interact with service provider computers 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computers are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 210 may be in communication with the user computing devices 204 and/or other service providers via the networks 208, or via other network connections. The service provider computers 210 may include one or more servers, perhaps arranged in a cluster, as a server farm, or as individual servers not associated with one another. These servers may be configured to implement the smart alerting functionality described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 216 may include multiple different types of memory, such as SRAM, DRAM, or ROM.

The memory 216, and the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail, which will be described in further detail in FIG. 3, the memory 216 may include an operating system 226, one or more data stores 228, and/or one or more application programs, modules, or services for implementing the features disclosed herein including a smart alerting service 230.

Figure 3:
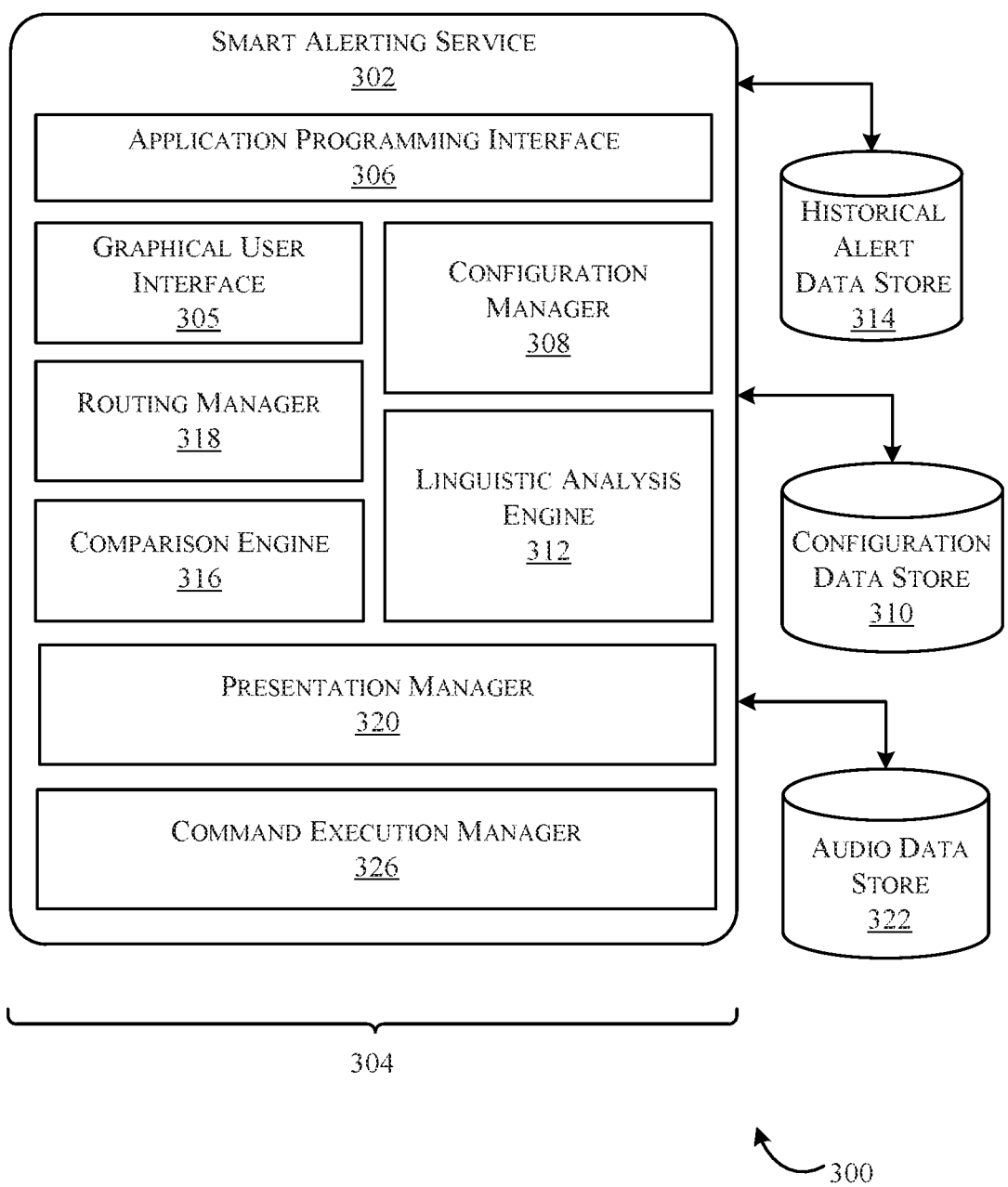
FIG. 3 schematically illustrates an example computer architecture for the smart alerting service, including a plurality of modules that may carry out various embodiments.

FIG. 3 schematically illustrates an example computer architecture 300 for a smart alerting service 302 (e.g., the smart alerting service 108) including a plurality of modules that may carry out various embodiments. The modules 304 may be software modules, hardware modules, or a combination thereof. If the modules 304 are software modules, the modules 304 can be embodied on a computer-readable medium and processed by a processor in any of the computer systems described herein. It should be noted that any module or data store described herein, may be, in some embodiments, a service responsible for managing data of the type required to make corresponding calculations. The modules may be configured in the manner suggested in FIG. 3 or may exist as separate modules or services external to the smart alerting service 108.

In accordance with at least one embodiment, a method is enabled for notifying a user utilizing a smart alert. For example, the smart alerting service 302 may be a component of one of the electronic devices discussed above in connection with FIGS. 1 and 2. The smart alerting service 302 may be stored on an electronic device or be stored on a server accessible to the electronic device. Electronic devices, as indicated above, may be a cell phone, a laptop computer, a desktop computer, a tablet PC, or any suitable device capable of receiving electronic messages including, but not limited to, texts and emails. A user may configure the smart alerting service 302 via a graphical user interface 305, a component of the smart alerting service 302. The user may enter configuration information including, but not limited to, audio sounds, tactile responses, text-to-speech options, group membership information, related message options, and routing preferences. The user may specify group membership information that includes email addresses and/or phone numbers of other users. Related message options may include a maximum number of related messages the user wishes to display with the received alert on delivery. Routing preferences may indicate that certain attributes of a message (e.g., certain addressees, and/or keywords in the subject line or body of the message) are to be routed to a particular location (e.g., a particular inbox accessible from a cell phone). Once information is entered via graphical user interface 305, application programming interface 306, a component of smart alerting service 302, may be utilized to communicate the information to smart alerting service 302.

In at least one example, configuration manager 308, a component of the smart alerting service 302, may be configured to receive configuration information from a user of an electronic device. The configuration manager 308 may be responsible for creating and maintaining a user profile utilized to store such configuration information. Further, the configuration manager may cause such configuration data to be stored in a configuration data store 310.

In accordance with at least one embodiment, configuration information may be received by the smart alerting service 302 via application programming interface 306. The configuration manager 308 may forward the message to a linguistic analysis engine 312, a component of the smart alerting service 302. The linguistic analysis engine 312 may analyze the received information for keywords contained within the subject line and/or body of the message for example. Once determined, the keywords, along with a portion of or the entire message may be stored in historical alert data store 314. Historical alert data store 314 may be responsible for storage of received electronic messages, keywords associated with each received electronic message, in addition to resolution information associated with each electronic message. The resolution information may be stored as part of resolution workflow executed in response to receiving the message discussed in further detail below.

In accordance with at least one embodiment, the linguistic analysis engine 312 may communicate the received message information to comparison engine 316, a component of the smart alerting service 302. The comparison engine 316 may be responsible for determining related messages by comparing keywords associated with the received electronic message to keywords associated with previously received electronic messages stored in historical alert data store 314. In at least one example, a keyword "Failure" may be found within the subject line of an electronic message. Additionally, a keyword "Fail" may be found within the subject line or body of a previously received message. These messages may be determined by the comparison engine 316 to be related, based at least in part on a similar root word "Fail." Additionally, multiple keywords may be utilized to determine related messages. For instance, the received message might contain the words "Purchase order drop of 27%." Similarly, a previously received message might contain the words "Purchase order drop of 35%." Comparison engine 316 may determine that these messages are related, based at least in part on the common words "purchase," "order," and "drop."

In accordance with at least one embodiment, the comparison engine 316 might determine multiple potentially related messages. In this case, the comparison engine 316 may score each potentially related message, based at least in part on the strength of commonality between the messages. For instance, given the received message contains the words "Purchase order drop of 27%," a previously received message containing the words "Purchase order drop of 35%" may receive a higher score than a previously received message containing the words "Traffic drop on system 11290." Additionally, "purchase order drop of 35%" may receive, for instance, a higher score than a message containing the words "Order reduction of 500 orders over the last 2 hours." However, the message containing the words "Order reduction of 500 orders over the last 2 hours" might receive a higher score than the previously received message containing the words, "Traffic drop on system 11290," due to the similarity of keywords, namely those of "order" and the determination that "drop" and "reduction" have similar meanings. Comparison engine 316 may use any suitable scoring method capable of distinguishing keyword relationships between messages. Once comparison is complete, the comparison engine 316 may cause the related message information to be stored as an association of the received message.

In accordance with at least one embodiment, routing manager 318 may be configured to receive message information from comparison engine 316. Upon receipt, routing manager 318 may query configuration data store 310 for information pertaining to routing instructions. For instance, a user may have configured the smart alerting service 302 to identify messages coming from a particular sender as requiring routing to a particular inbox. For instance, a user may decide that messages coming from "Bob Parker," phone number "206- 321-4563," and/or email address "bobp@boss.com" require that the messages be delivered to a particular inbox accessible by the user's cell phone. For example, the user may specify that such message be delivered to an inbox entitled "Boss emails." Upon receipt of a message sent from a user identified as "Bob Parker" the routing manager 318 may identify the message and routing instructions indicating that the message is to be deliverable to inbox "Boss emails." The routing manager 318 may cause the received message to be associated with particular routing instructions.

In accordance with at least one embodiment, the routing manager 318 may ascertain group membership information specified in the configuration information stored in configuration data store 310 in order to forward the received message to other users. For instance, the user may have specified in configuration data that messages received from "technical-group@companyA.com" are to be forwarded to an inbox entitled "Work Emails" in addition to forwarding the message to three other group members identified by email address or phone number. Once group membership information is determined, the routing manager 318 may compose a new message, mark the message as inactive to prevent actual alerting to the recipient, and forward the newly composed message to the three identified group members.

In accordance with at least one embodiment, presentation manager 320, a component of smart alerting service 302, may be configured to receive information from routing manager 318. If the message is configured to be displayed with an audio component (e.g., a musical tune, a series of tones, etc.), presentation manager 320 may query audio data store 322 for the configured audio information associated with the message. In some instances, audio information may include an audio file to be used in presenting the message. The audio data store 322 may be responsible for storing audio files to be used in presenting the message. The audio data store 322 may exist external to the smart alerting service 302 or may be a component of the smart alerting service 302. The audio data store 322 may be a user's musical database managed by another application external to the smart alerting service 302 or the audio data store 322 may be managed by the smart alerting service 302. The presentation manager 320 may then generate an alert to be delivered to the user such that delivery of the alert causes the audio contained in the audio file to play on device where delivery occurs.

In accordance with at least one embodiment, presentation manager 320 may consult configuration information from configuration data store 310 to determine how many, if any, related messages to display with the generated alert. For instance, a user may have indicated a desire to view the top five related messages within any alert received. Given this information ascertained from the configuration data associated with the user, the presentation manager 320 may cause information regarding the highest scored related messages, up to five messages, to be displayable within a generated alert. In one example, this might be achieved by displaying within the generated alert, information associated with the up to five related messages (e.g., an identification number for each related message) as text, or perhaps a hyperlink, within the display of the generated alert. Additionally, presentation manager 320 may ascertain other configuration information described above, and tailor the alert to exhibit corresponding behaviors and attributes.

In accordance with at least one embodiment, a user may access the alert to gain knowledge of the existence of a current issue requiring his attention. As a result of his efforts to resolve the issue, one or more tasks may be identified. For instance, a user who receives an alert indicating a "Purchase Order drop of 37%" may eventually discover that server B has been inoperable for the last hour, resulting in a purchase order drop due to the inability of users of the electronic marketplace to utilize a purchasing interface. Further, the user may determine that a course of action to resolve such an issue may include rebooting server B. This resolution step may be associated with a corresponding message stored in the historical alert data store 314. Later, a new message may be received via the method defined above. The user, having been presented an alert containing multiple related messages, may opt to select one to view. This selection may be received by the presentation manager 320. The presentation manager 320 may cause information associated with the selected message to be displayed to the user. Alternatively, the presentation manager 320 may present an identifier of the related message as a hyperlink or text. The user, upon selection of the hyperlink, may be directed to a web page where information regarding the related message may be accessible. The user may discover that the related message contains resolution information indicating that the course taken to resolve the issue was to reboot server B. In at least one example, the user may be presented the opportunity to select the resolution associated with the related message.

In accordance with at least one embodiment, the related message specifies a resolution workflow indicating a reboot of server B has been performed. The user may indicate, via the alert, his desire to execute the same course of action. This indication may be received by command execution manager 326, a component of the smart alerting service 302. In at least one example, the command execution manager 326 may receive information regarding the desired action and may convert this information into executable device commands to be executed on a corresponding device. In the current example, the command execution manager 326 may receive information indicating that server B should be rebooted. Command execution manager 326 may convert this information into executable device instructions and send the device instructions via application programming interface 306 to the corresponding device for execution. Additionally, command execution manager 326 may associate such action with the corresponding message stored in historical alert data store 314. Furthermore, command execution manager 326 may send an inactive message containing information regarding device instructions to other members of a group such that the other members of the group are able to access such information.

In accordance with at least one embodiment, a resolution workflow indicated in a related message may be automatically executed by the command execution manager 326. For instance, if a user failed to respond to the alert within a threshold period of time, command execution manager 326 may consider the lack of response as acquiescence and proceed with execution of device commands indicated by the resolution workflow. In at least one example, the user may affirmatively respond via graphical user interface 305 with a response indicating the user's desire to execute the resolution workflow. In this example, graphical user interface 305 would communicate such information via application programming interface 306 to command execution manager 326. Command execution manager 326, upon receipt of such information may cause the corresponding device commands associated with the resolution workflow to be executed on the appropriate electronic device.

Figure 4:
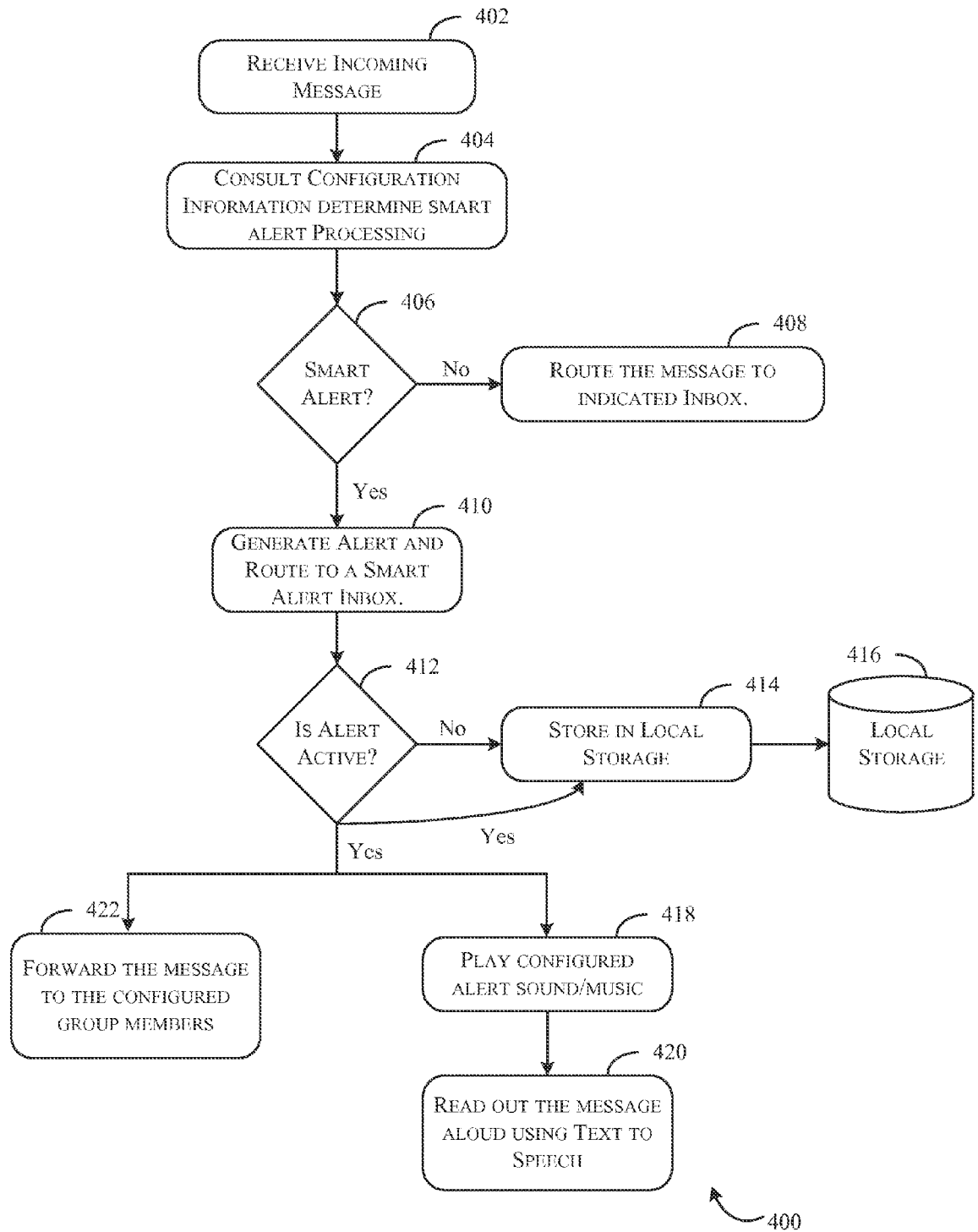
FIG. 4 is a flowchart illustrating a method for utilizing the smart alerting service described herein, in accordance with at least one embodiment.

FIG. 4 is a flowchart 400 illustrating a method for utilizing the smart alerting service described herein, in accordance with at least one embodiment. The method 400 may begin at 402, where an incoming message is received by the smart alerting service (e.g., the smart alerting service 302). The smart alerting service 302 may consult configuration information to determine whether the message ought to be processing as a smart alert at 404. The determination as to whether or not to process the incoming message as a smart alert is determined at 406. If the message is not to be processed as a smart alert, the message is routed to an inbox as indicated in the message in the typical manner.

In accordance with at least one embodiment, if the message is to be processed as a smart alert, an alert may be generated in accordance with the configuration information and may be routed to a smart alert inbox at 410. A determination as to whether the alert is active or inactive is made at 412. If the alert is inactive, the alert may be stored in local storage at 414, for instance, in local storage 416, a data store located on an electronic device. If the alert is determined to be active at 412, then the smart alerting system 302 may cause, in accordance with configuration information, an alert sound and/or music to be played on the electronic device at 418. Once the sound/music has subsided, or alternatively during the playing of the sound/music, the smart alerting service 302 may cause the message to be read aloud utilizing text-to-speech technology at 420. Additionally, if group membership information was defined in the configuration information, the smart alerting system 302 may forward the message to the configured group members.

Figure 5:
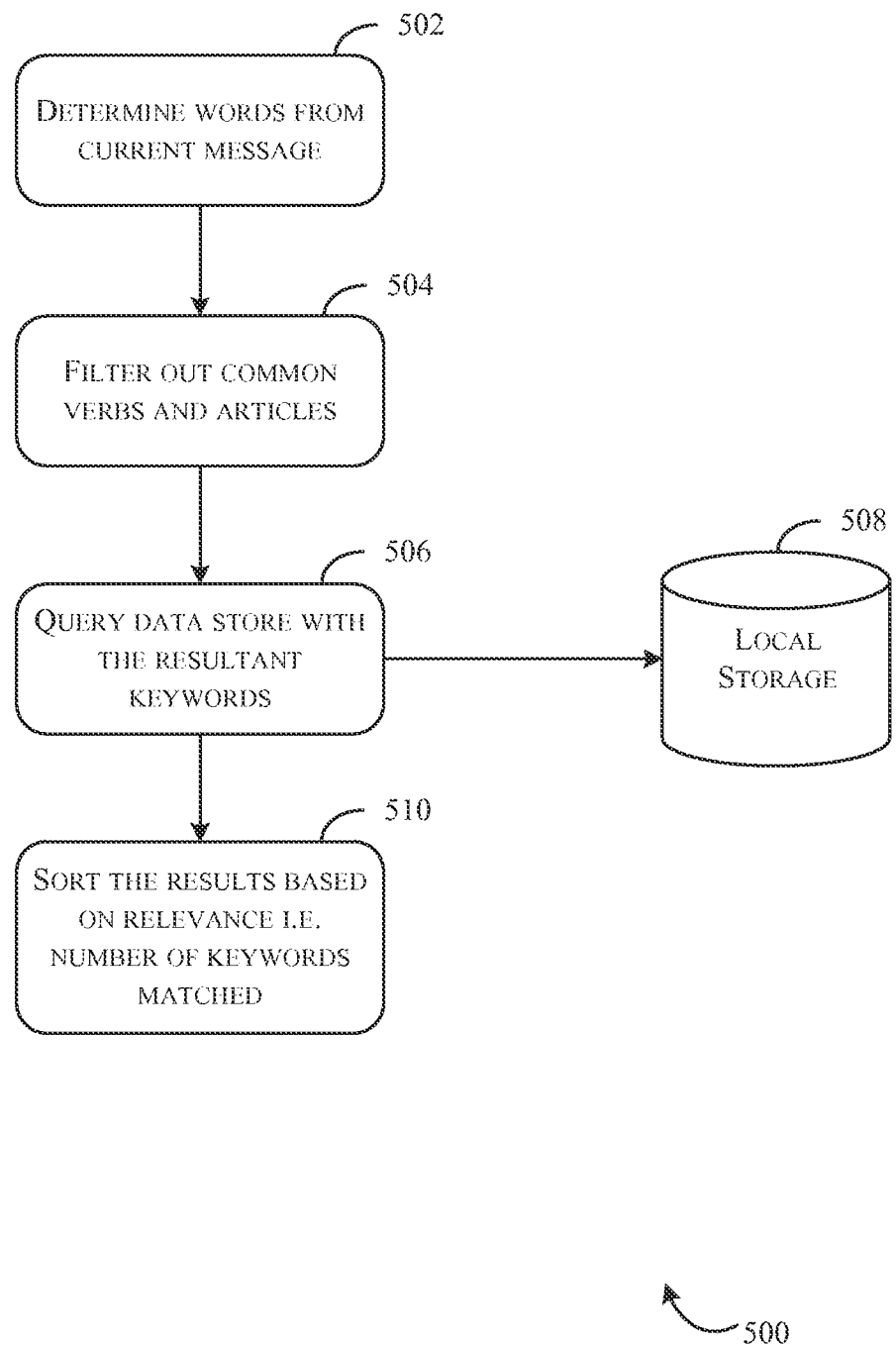
FIG. 5 is a flowchart illustrating a method for utilizing the smart alerting service described herein, in accordance with at least one further embodiment.

FIG. 5 is a flowchart 500 illustrating a method for utilizing the smart alerting service described herein, in accordance with at least one further embodiment. In flowchart 500, a method for determining related messages is shown. The flow begins at 502, where words are determined from the current message. Common verbs and articles may be filtered out of the determined words at 504. A data store may be queried (e.g., local storage 506) with the resultant keywords at 508. The results may be sorted, based at least in part on a relevancy determination (e.g., the number of keywords matched) at 510.

FIG. 6A and FIG. 6B are schematic diagrams 600A and 600B each depicting aspects of an example smart alerting service in accordance with at least one embodiment. Diagram 600A depicts a method for routing smart alerts to multiple users. In a first use case, as depicted in the diagram 600A, these users 602, 604, 606 may belong to a group 608 (e.g., a technical division/group of a company). The smart alerting service 610 (e.g., the smart alerting service 302), running on device 612, may receive messages, generate alerts, and passively broadcast (e.g., Whispersync) the messages to various group members in order to store or generate alerts on devices utilized by the various group members. In one illustrative example, a message may indicate a particular recipient (e.g., user 602), the message received by smart alerting service 610. The smart alerting service 610 may receive and process the message in a similar manner as described above. Additionally, in some cases, the smart alerting service 610 may forward an inactive alert to users 604 and 606. Smart alerting services 614 and 616, running on devices 618 and 620 respectively, may receive and process the messages. The inactive designation may indicate that the alert should be forwarded but not presented to users 604 and 606. In this case, the alert will be stored on devices 618 and 620 for future reference but may not be actually displayed to users 604 and/or 606.

In accordance with at least one embodiment, as illustrated by the use case depicted in the diagram 600B, user 602 may be unable to resolve a particular issue and may choose to forward a received message to user 604. Alternatively, user 602 may indicate to multiple users, for instance users 604 and 606, an inability to respond to the received message. In at least one example, the user may indicate that he is unable to work the issue (e.g., by selecting a button entitled "get help"). Alternatively, the indication may occur due to user 604 failing to respond to the received message within a threshold period of time. Upon elapse of the threshold period of time, users 604 and 608 may be alerted, using the previously received message. The alert may occur by a message being sent from smart alerting service 610 to smart alerting services 614 and 616, resulting in the previously received message being toggled from inactive to active at smart alerting services 614 and 616. In at least one case, user 604 may select to begin work on the described issue contained in the received message (e.g., by selecting a button entitled "help a coworker" or merely by opening the alert).

Upon work being initiated (e.g., by user 604) an updating message may be sent to smart alerting services 610 and 616 to notify users 602 and 606 respectively. Additionally, any steps taken by user 604 to resolve the technical problem indicated by the received message may be stored locally and communicated to users 602 and 606 such that the information may be stored locally on devices 612 and 620, respectively. In this manner, messages and resolution workflow information (e.g., steps taken to resolve the technical problem) may be synchronized among users 602, 604, and 608. This enables a user to utilize device commands and other resolution steps taken previously, by him or other users, in his endeavor to correct the current technical problem. Additionally, coordination of who may be tasked with working the issue may be efficiently handled to avoid duplicate work being conducted by members of the group. Furthermore, stale issues are avoided, given that only a threshold period of time may pass before other users are notified of a pending issue.

Figure 7:
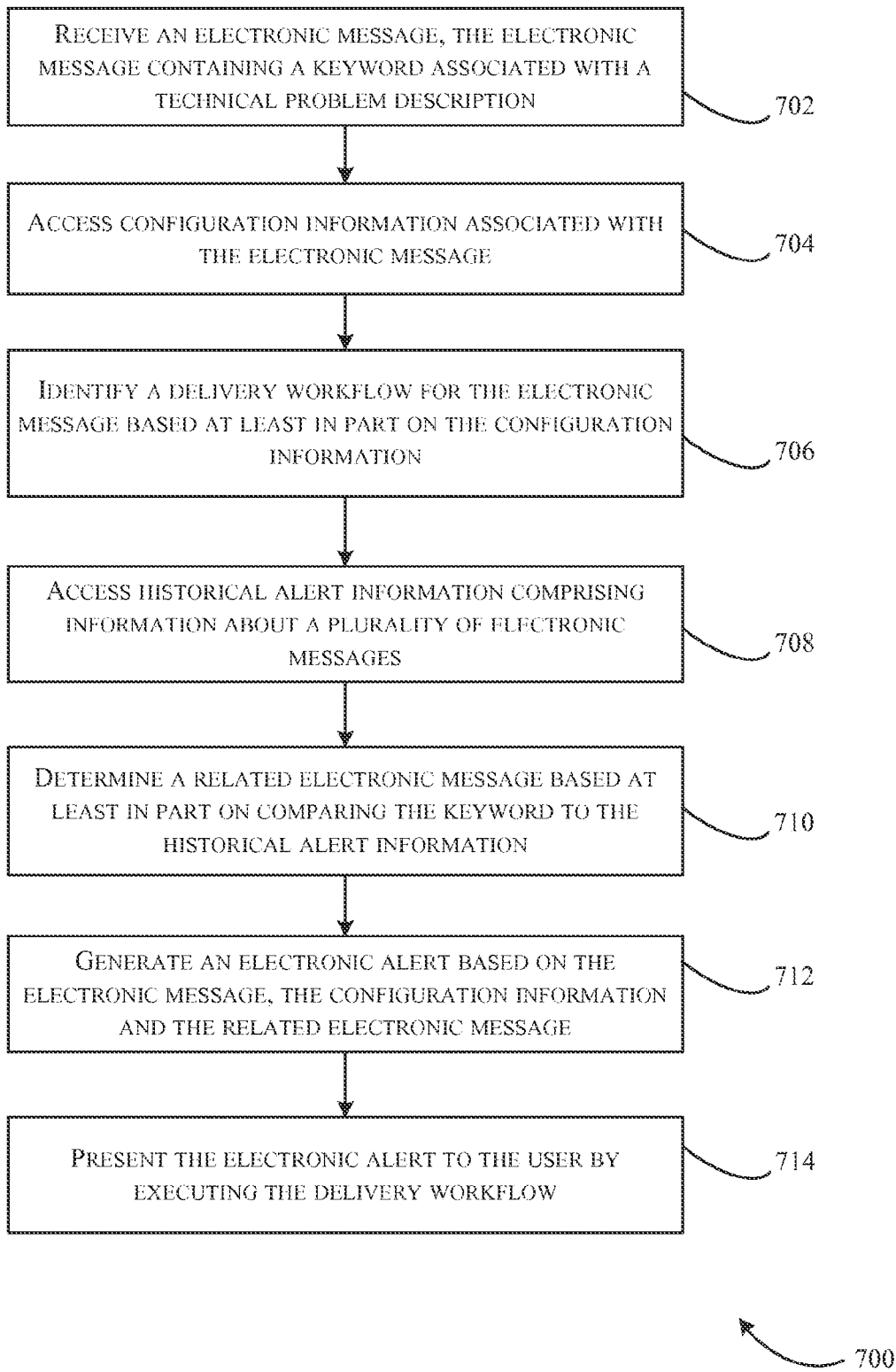
FIG. 7 is a flowchart illustrating a method for utilizing a smart alerting service in accordance with still one further embodiment.

FIG. 7 is a flowchart illustrating a method for utilizing a smart alerting service in accordance with still one further embodiment. The flow 700 may begin at 702 where an electronic message containing a keyword associated with a technical problem description may be received. At 704, configuration information associated with an electronic message may be received from a user of an electronic device. At 706, a delivery workflow for the electronic message may be identified based at least in part on the configuration information. Historical alert information comprising information about a plurality of electronic messages may be received at 708. At 710, a related electronic message may be determined, based at least in part on comparing the keyword to the historical alert information. At 712, an electronic alert may be generated based at least in part on the electronic message, the configuration information, and the related electronic message. The electronic alert may be presented to the user by executing the delivery workflow at 714.

Figure 8:
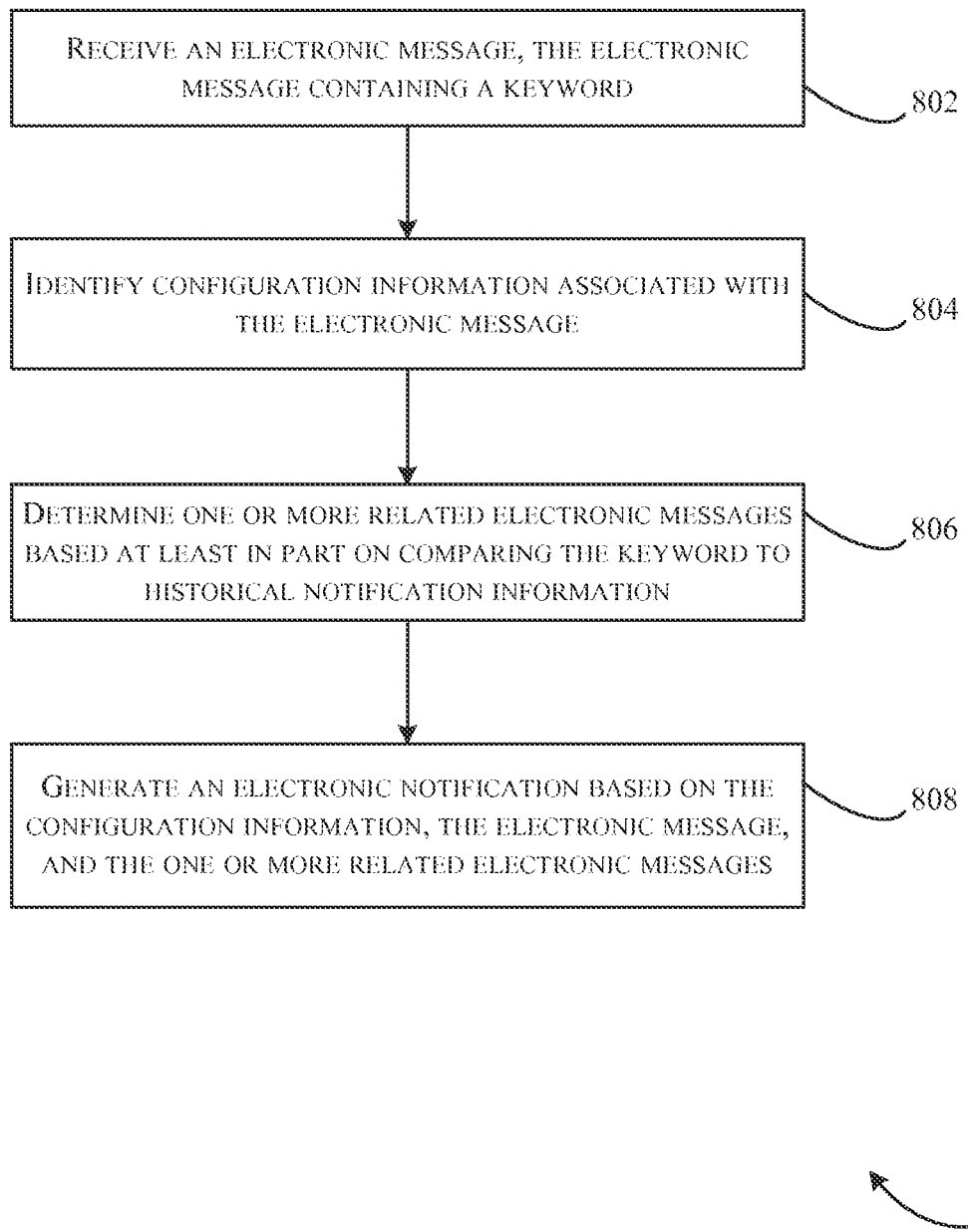
FIG. 8 is a flowchart illustrating a method for utilizing a smart alerting service in accordance with at least one other embodiment.

FIG. 8 is a flowchart illustrating a method for utilizing a biometric recognition service in accordance with at least one other embodiment. Flow 800 may begin at 802, when an electronic message may be received, the electronic message containing a keyword. At 804, configuration information associated with an electronic message may be identified. At 806, one or more related electronic messages may be determined, based at least in part on comparing the keyword to the historical notification information. At 810, an electronic notification may be generated based at least in part on the configuration information, the electronic message, and the one or more related electronic messages.

Figure 9:
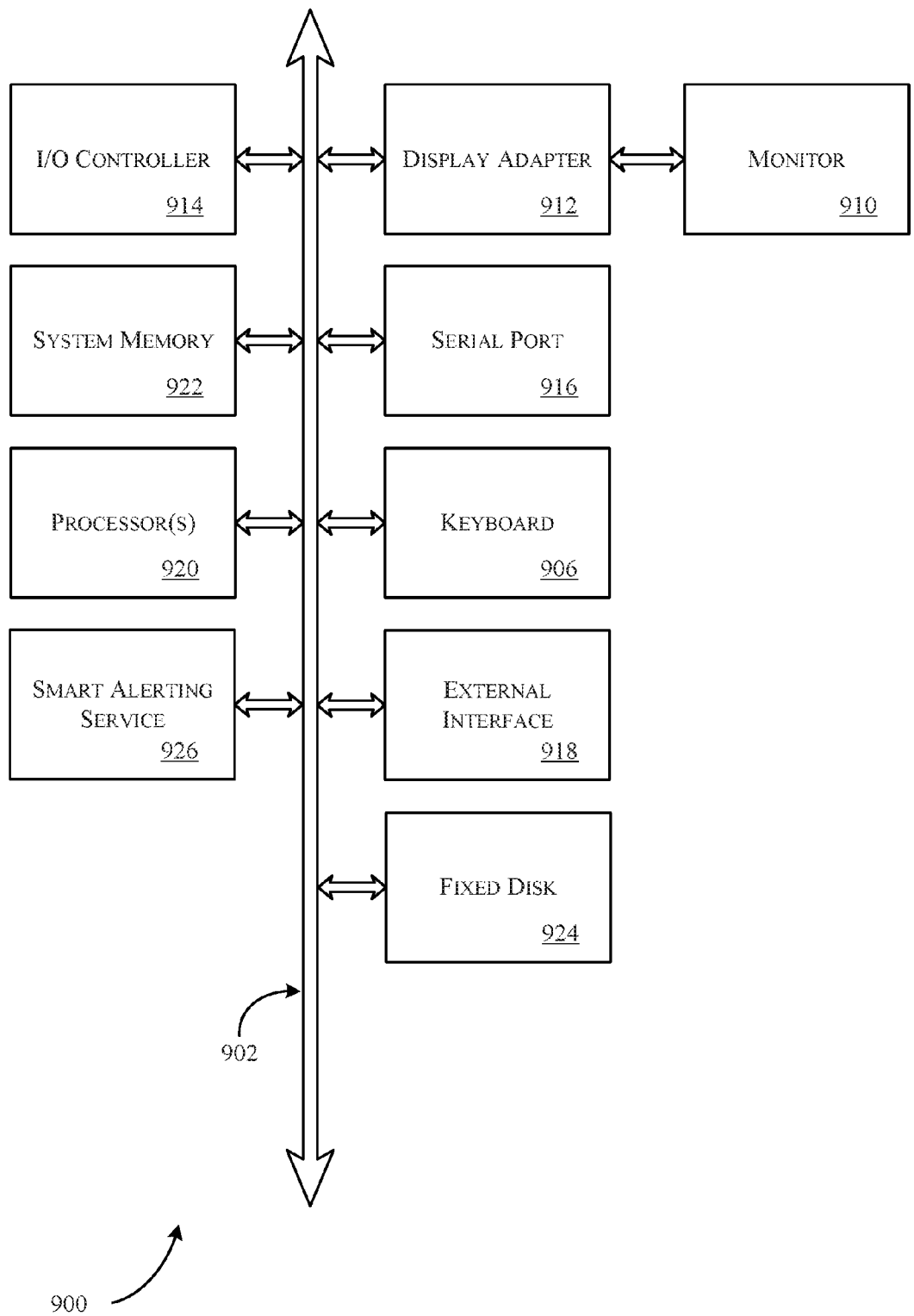
FIG. 9 is a schematic diagram that illustrates aspects of an example architecture for a computing device capable of providing a smart alerting service in accordance with at least one embodiment.

FIG. 9 is a schematic diagram that illustrates aspects of an example architecture for a computing device capable of providing a biometric recognition service in accordance with at least one embodiment. The system, apparatus, methods, processes and/or operations for providing the features of a biometric recognition service may be wholly or partially implemented in the form of a set of instructions executed by one or more programmed computer processors such as a central processing unit (CPU) or microprocessor. Such processors may be incorporated in a computing device 901 operated by, or in communication with, other components of the system. Such a computing device 901 may be any suitable type of computing device 901 such as, but not limited to, a mobile phone, a smart phone, a personal digital assistant (PDA), a laptop computer, a desktop computer, a thin-client device, a tablet PC, an electronic book (e-book) reader, etc.

As an example, FIG. 9 depicts aspects of elements that may be present in an electronic device and/or system 900 (e.g., the electronic device 108) configured to implement a method and/or process in accordance with some embodiments of the present disclosure. The subsystems shown in FIG. 9 are interconnected via a system bus 902. Additional subsystems include a keyboard 906, and a monitor 910, which is coupled to a display adapter 912. Peripherals and input/output (I/O) devices, which couple to an I/O controller 914, can be connected to the computer system by any suitable number of means known in the art, such as a serial port 916. The computer system may be made up of one or many computers. The serial port 916 or an external interface 918 can be utilized to connect the computer device 900 to further devices and/or systems not shown in FIG. 9, including a wide area network such as the Internet, a mouse input device, and/or a scanner.

The interconnection via the system bus 902 allows one or more processors 920 to communicate with each subsystem and to control the execution of instructions that may be stored in a system memory 922, and/or a fixed disk 924 as well as the exchange of information between subsystems. The processor(s) 920 may be implemented as appropriate in hardware, computer-executable instructions, firmware, or combinations thereof. Computer-executable instructions or firmware implementations of the processor(s) 920 may include computer-executable or machine-executable instructions written in any suitable programming language to perform the various functions described. The system memory 922 may store program instructions that are loadable and executable on the processor(s) 920, as well as data generated during the execution of these programs. Depending on the configuration and type of computing device, the system memory 922 may be volatile (such as random access memory (RAM)) and/or non-volatile (such as read-only memory (ROM), flash memory, etc.). The computing device may also include additional removable storage and/or non-removable storage including, but not limited to, a fixed disk 924 including, but not limited to, magnetic storage, optical disks, and/or tape storage. The disk drives and their associated computer-readable media may provide non-volatile storage of computer-readable instructions, data structures, program modules, and other data for the computing devices. In some implementations, the system memory 922 may include multiple different types of memory, such as static random access memory (SRAM), dynamic random access memory (DRAM), or ROM. Smart alerting service 926 (e.g., the smart alerting service 302) may be configured to operate on electronic device 108 as a service or application.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, an electronic message, the electronic message containing a keyword associated with a technical problem description;
   accessing configuration information associated with the electronic message;
   identifying a delivery workflow for the electronic message based at least in part on the configuration information, the delivery workflow identifying instructions for delivering an electronic alert;
   accessing historical alert information comprising information about a plurality of messages;
   determining a related message from the plurality of messages based at least in part on comparing the keyword to the historical alert information;
   generating, by the computer system, the electronic alert based at least in part on the received electronic message, the configuration information, and the related message; and
   executing the delivery workflow to enable presentation of the electronic alert to the user.

2. The computer-implemented method of claim 1, wherein the configuration information includes at least one of an audio option, a tactile option, or a delivery option.

3. The computer-implemented method of claim 1, wherein the historical alert information includes at least a description of a technical problem and a resultant action taken in response to the technical problem.

4. A computer-implemented method, comprising:
   receiving, by a computer system, an electronic message, the electronic message containing a keyword;
   identifying configuration information associated with the electronic message;
   accessing historical notification information comprising information about a plurality of messages;
   determining, by the computer system, one or more related messages of the plurality of messages based at least in part on comparing the keyword to the historical notification information; and
   generating an electronic notification based at least in part on at least one of the configuration information, the received electronic message, or the one or more related messages.

5. The computer-implemented method of claim 4, further comprising:
   calculating a score for each related message of the one or more related messages based at least in part on the comparing of the keyword to the historical notification information; and
   presenting the one or more related messages to a user based at least in part on the score.

6. The computer-implemented method of claim 5, further comprising:
   receiving, from the user, a selection indicating a particular related message of the one or more related messages; and
   associating the particular related message with the received electronic message.

7. The computer-implemented method of claim 6, determining a resolution workflow associated with the particular related message, the resolution workflow identifying at least one device command to be executed.

8. The computer-implemented method of claim 7, further comprising executing the identified at least one device command.

9. The computer-implemented method of claim 4, wherein the configuration information includes membership information indicating the user belongs to a group of users.

10. The computer-implemented method of claim 4, further comprising synchronizing delivery of the electronic notification to the group of users.

11. The computer-implemented method of claim 10, further comprising:

determining that one of the group of users has claimed an ownership status of the electronic notification; and
updating the group of users regarding the ownership status.

12. A system, comprising:
a processor; and
a memory storing computer-executable instructions that, when executed by the processor, cause the system to, at least:
receive an electronic notification, the electronic notification containing a keyword;
identify configuration information associated with the electronic notification;
access historical alert information comprising information about a plurality of notifications;
determine a related notification based at least in part on comparing the keyword to the historical alert information;
generating an electronic alert based at least in part on the received electronic notification, the related notification, and the configuration information; and
providing the generated electronic alert.

13. The system of claim 12, wherein the configuration information includes at least one of a music, sound, or vibration associated with an electronic alert.

14. The system of claim 12, wherein the configuration information indicates a delivery workflow based at least in part on at least one of a sender, a subject line, or a body of an electronic notification and wherein presenting the user the electronic alert includes executing the delivery workflow.

15. The system of claim 12, further comprising:
determining a resolution workflow based at least in part on the related notification; and
executing the determined resolution workflow.

16. The system of claim 15, wherein executing the determined resolution workflow is subsequent to a threshold time period elapsing within which the user has failed to respond.

17. The system of claim 15, wherein executing the determined resolution workflow is subsequent to receiving a response from the user.

18. The system of claim 15, wherein the resolution workflow includes one or more device commands related to a remote device.

19. The system of claim 15, wherein the resolution workflow includes creation of a record to store at least a portion of the electronic notification and the related notification.

20. A non-transitory computer-readable storage medium having stored thereon computer-executable instructions that, when executed by a processor, cause the processor to perform operations comprising:
receiving an electronic notification, the electronic notification containing a keyword;
identifying configuration information associated with the electronic notification;
accessing historical notification information comprising information about a plurality of messages;
determining a related message based at least in part on comparing the keyword to historical notification information;
generating an electronic alert based at least in part on the received electronic notification, the related notification, and the configuration information; and
providing the electronic alert to the user.

21. The non-transitory computer-readable storage medium of claim 20, wherein the electronic notification indicates an active/inactive mode, and wherein determining the related message, generating the electronic alert, and providing the electronic alert to the user, are based on a determination that the electronic notification is in an active mode.

22. The non-transitory computer-readable storage medium of claim 20, the computer-executable instructions further causing the processor to perform operations comprising:
determining a resolution workflow based at least in part on the related electronic notification; and
executing the determined resolution workflow.

23. The non-transitory computer-readable storage medium of claim 22, wherein determining the resolution workflow utilizes a machine learning algorithm and wherein executing the determined resolution workflow includes utilizing an application program interface to execute device commands on a remote device.

24. The non-transitory computer-readable storage medium of claim 20, the computer-executable instructions further causing the processor to perform operations comprising:
associating the received electronic notification with the related notification; and
storing information related to the received electronic notification, the related notification, and the association.

* * * * *